(12) United States Patent
Kokladas

(10) Patent No.: US 7,717,486 B2
(45) Date of Patent: May 18, 2010

(54) CARGO AND WEIGHT HOLDING TRUCK BED ACCESSORY

(76) Inventor: Shawn P. Kokladas, 217 Congress Dr., Pittsburgh, PA (US) 15236

(*) Notice: Subject to any disclaimer, the term of this patent is extended or adjusted under 35 U.S.C. 154(b) by 272 days.

(21) Appl. No.: 12/019,704

(22) Filed: Jan. 25, 2008

(65) Prior Publication Data

US 2009/0189405 A1    Jul. 30, 2009

(51) Int. Cl.
*B60R 9/00*    (2006.01)

(52) U.S. Cl. .................. 296/37.6; 280/757; 280/759

(58) Field of Classification Search ........... 296/39.1, 296/39.2, 37.6; 280/757, 759; 114/121, 114/122
See application file for complete search history.

(56) References Cited

U.S. PATENT DOCUMENTS

| | | | |
|---|---|---|---|
| 4,333,678 A | 6/1982 | Munoz et al. | |
| 4,796,914 A | 1/1989 | Raynor | |
| 4,971,356 A * | 11/1990 | Cook | ......... 296/39.2 |
| 4,991,899 A | 2/1991 | Scott | |
| 5,080,418 A | 1/1992 | Semple et al. | |
| D346,991 S | 5/1994 | Krieger, Jr. | |
| 5,330,227 A | 7/1994 | Anderson | |
| 5,372,396 A | 12/1994 | Van Nahmen | |
| D355,321 S | 2/1995 | Giles | |
| 5,568,890 A * | 10/1996 | Magee et al. | ......... 296/37.6 |
| 5,599,055 A * | 2/1997 | Brown | ......... 296/39.2 |
| 5,657,916 A * | 8/1997 | Tackett | ......... 296/37.6 |
| 6,283,527 B1 * | 9/2001 | Desmarais | ......... 296/39.2 |
| D486,439 S | 2/2004 | Green | |
| 7,159,902 B2 | 1/2007 | Carty | |

* cited by examiner

*Primary Examiner*—Lori L Lyjak
(74) *Attorney, Agent, or Firm*—McKay & Associates, P.C.

(57) ABSTRACT

A truck bed accessory for accommodating weights and stored articles. At least one panel is adapted to be situated between the wheel wells of the truck and over the rear axle of the truck. A receptacle is defined within the interior of the main panel over the rear axle. A weight holder for disposition in the receptacle includes a plurality of weight receiver bins adapted to secure weights therein so that the weight over the rear axle can be varied to increase traction. When the weight holder is not in use, the accessory can store other articles for covered transport.

10 Claims, 2 Drawing Sheets

CARGO AND WEIGHT HOLDING TRUCK BED ACCESSORY

BACKGROUND

1. Field of the Invention

The instant invention relates to accessories for the beds of pick-up trucks. Particularly, the present invention is a truck bed floor panel which is adapted to hold weights for improving the traction of the truck and which also serves as a removable cargo storage device.

2. Description of the Related Art

Pick-up trucks have a tendency to slip and lose traction during periods of rain or snow because of the minimal weight applied to the rear axle. These vehicles obviously have the weight of the engine and transmission positioned primarily over the front two wheels. This leaves comparatively little weight in the rear for urging the drive wheels to maintain traction on slippery roads. The problem is compounded when the truck bed or storage space is completely empty. Adding to the downward force applied over the vehicle's rear axle would improve handling and control in slippery conditions.

To combat this lack of rear tire grip, some pickup owners add weight to their truck beds in the form of sandbags, firewood, or cement blocks. The added weight improves traction for the tires on slippery road surfaces. Unfortunately, these loose weights also have a tendency to spill or bounce around within the bed with every sharp turn or sudden deceleration. This can be a nuisance to the pickup driver and might also damage the bed and any cargo being transported.

Other stabilizing inserts are known in the art, which typically are water-fillable devices or weight means incorporated directly within a non-removable bed liner. U.S. Pat. No. 5,080,418 provides an insert arranged for complementarily mounting within a pickup truck bed, wherein the insert includes a planar wall construction, with a ribbed top wall to enhance strength and traction of the top wall. The organization defines a central cavity coextensively directed throughout the insert, with a fill plug directed to the top wall and a drain plug directed through and removably mounted relative to the rear wall to permit fluid filling of the cavity to provide weight and enhanced stabilizing of the pickup bed.

U.S. Pat. No. 7,159,902 teaches a vehicle bed liner apparatus including a peripherally sealed flexible top wall and flexible bottom wall for containing a quantity of ballast liquid, e.g. water.

U.S. Pat. No. 5,330,227 shows an apparatus composed of a plurality of elongated containers each with a predetermined rectangular cross-section and an inner peripheral surface with sidewalls and hold down surfaces.

U.S. Pat. No. 4,796,914 demonstrates a protective bed liner with ballast means incorporated in the liner for at times providing stability and traction for the truck in which the protective liner is positioned and which ballast means can be provided at very little additional cost over and above the normal cost of a conventional type of protective bed liner. The ballast means includes a hollow compartment formed in the bottom wall of the protective liner and defining a ballast chamber therein. A filling opening is provided for permitting liquid ballast to be inserted in the ballast chamber.

Utilizing water-filled ballast systems in times of frigid weather is an inconvenience and a hazard. Furthermore, when the ballast liquid freezes, the weight of the system can not be varied, and indeed results in an immobile accessory. These systems also impact the use of the truck bed itself because they are high-profile, cause variants in the surface of the truck bed, and could be subject to puncture. Furthermore, traction systems are not always desirable, so the implementation of the weights directly into a non-removable liner is problematic. There is a need then for an easy-to-use panel system which is low profile but would still enable various loads to be carried without interference. Among other attributes, in the off-season, the product is easily removed and stored, and even during use, the weight system can be removed from the product to reveal added, covered storage space, as follows.

SUMMARY OF THE INVENTION

It is the objective of the instant invention to provide a truck-bed accessory which allows for the addition of easily removable weights over the rear axle of the truck.

It is further an objective of the instant invention to allow for the amount of weight to be easily varied.

It is still further an objective of the instant invention to allow the full space of the truck bed to be useable even when the instant accessory is in use.

It is still further an objective of the instant invention to allow the accessory to double as a covered cargo holder when the weight system is not in use but when the accessory is still in place in the bed of the truck.

It is still further an objective of the instant invention to allow the accessory to be easily and efficiently implemented into the bed and then removed and stored easily during periods of non-use.

Accordingly, what is provided is truck bed accessory comprising a front panel, a main panel having an interior, and a rear panel. The main panel is removably connected to the front panel and the rear panel such that the main panel is disposed between the front panel and the main panel and adapted to be situated between the wheel wells of the truck and over the rear axle of the truck with the front panel disposed near the cab of the truck and the rear panel disposed near the tailgate of the truck. A receptacle is defined within the interior of the main panel over the rear axle. A weight holder comprises a plurality of weight receiver bins adapted to secure weights therein so that the weight over the rear axle can be varied. A lid covers the receptable and the weight holder, the lid being flush with the top surface of the main panel when in a closed position.

DETAILED DESCRIPTION OF THE PREFFERED EMBODIMENT

Figure 1:
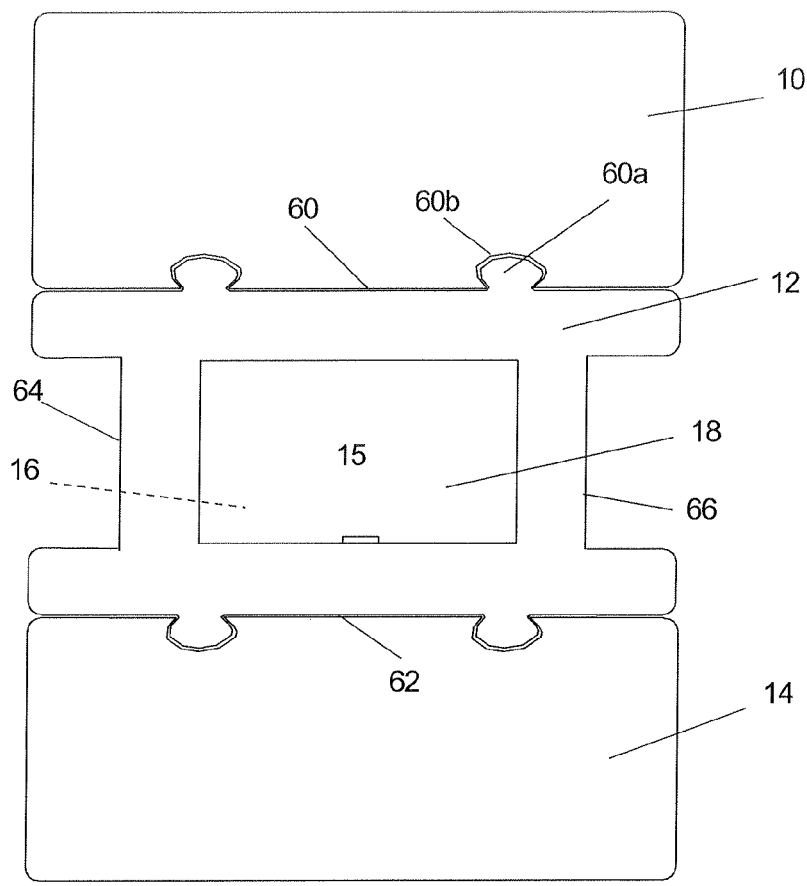
FIG. 1 shows a top elevation view of the instant invention.
Figure 2:
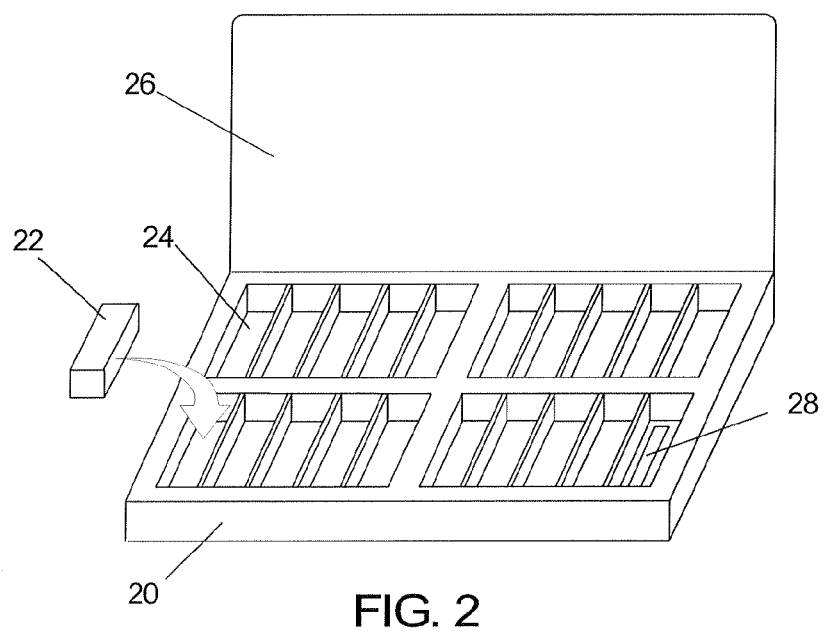
FIG. 2 shows a perspective view of the weight holder adapted to be inserted into the receptacle of FIG. 1.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated kit assembly, and such further applications of the principles of the invention illustrated herein, as would normally occur to persons skilled in the art to which the invention relates. This detailed description of this invention is not meant to limit the invention, but is meant to provide a detailed disclosure of the best mode of practicing the invention.

With reference then to FIGS. 1-5, shown is the instant truck bed accessory. In the preferred embodiment the accessory takes the form of a multi-piece panel system. Similar to a bed-liner, each panel can be made of a plastic, composite or other strong and rigid but lightweight material. For instance, when formed into plastic or composite, the interiors of each panel are hollow and this lightweight construction allows any type of user to lift and assemble and easily disassemble the panel system.

The front panel 10 is a generally rectangular panel conforming to the shape of the truck bed 2 and situated near the cab 5 of the truck 1. As defined herein, "near" means abutting the cab 5 or located proximate to the cab 5. This will depend on what size panel system is implemented. It is desirable that only a limited space, if any, is left between the front panel 10 and cab 5 so that a large gap does not impact the full use of the truck bed 2. But because of their ease of construction, the panels can be made with different sizes depending on the manufacturer of the truck and the resulting size of the truck bed 2. As defined herein, "bed" can also be construed as the interior trunk of a vehicle other than a pick-up truck.

A main panel 12 is adapted to interlock with the front panel 10. The main panel 12 has a central portion 15, a top surface 17, and an interior 19. This main panel 12 is removably connected to the front panel 10 and to a rear panel 14 such that the main panel 12 is disposed between the front panel 10 and the rear panel 14 with the central portion 15 adapted to be situated between the wheel wells 3 of the truck 1 and over the rear axle of the truck 1. For example the main panel 12 comprises a front edge 60, a rear edge 62, a left edge 64, and a right edge 66. The front edge 60 means for interlocking the main panel 12 to the front panel 10 includes a male end or some other type of projecting member 60a for insertion into a receiving portion 60b of the front panel 10. The rear edge 62 preferably would include the similar feature although the main panel 12 could include the receiver portion in the alternative. The resulting design allows each panel to be efficiently placed and maneuvered, and easily removed and stored without occupying considerable space.

It should be understood that use of the main panel 12 is critical to the invention. But the main panel 12 can be used solely by itself or with the front panel 10 and/or rear panel 14 depending on the desired surface of the truck and the size of the truck bed/trunk and accompanying panels. Use of only the one main panel 12 may also be desirable for very small beds or even within the rear cargo areas of cars and sport utility vehicles. Accordingly, one or more panels make up the invention. In fact, if a containment mechanism is utilized on the underside of the truck 1, the main panel 12 can be situated underlying the bed 2 provided there remains access to the receptacle 16.

Figure 3:
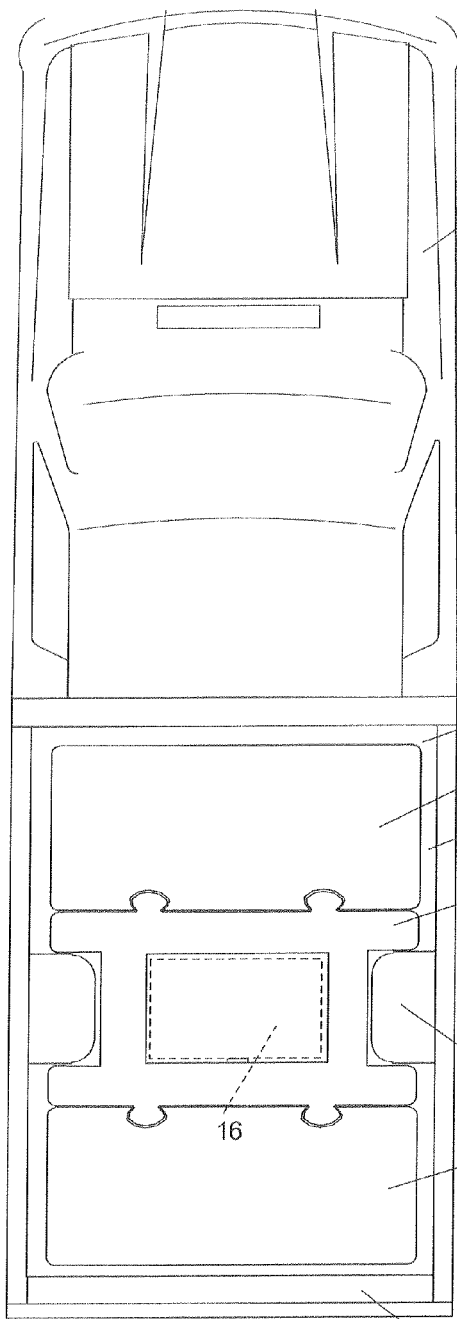
FIG. 3 shows a top elevation view of the instant invention in use within the bed of a pick-up truck.
Figure 4:
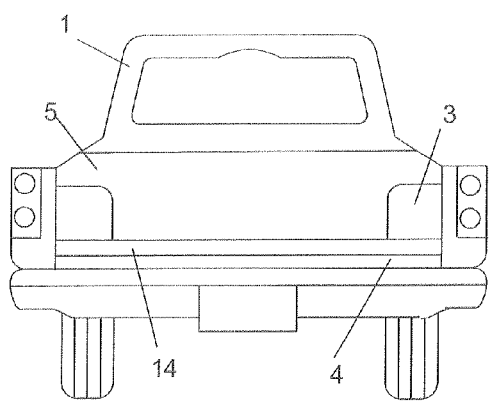
FIG. 4 shows a rear view of the instant invention in use within the bed of the pick-up truck.

The left edge 64 and the right edge 66 of the main panel 12 are generally u-shaped to define a well space through which each wheel well 3 of the truck 1 can be situated (see FIG. 3). The rear panel 14 would then be placed near or against the tailgate 4 of the truck 1. In this manner, a completely uniform, weight bearable, and flat surface is maintained within the entirety of the truck bed 2 so that the hauling utility of the pick-up truck is maintained even while the instant accessory is being used. Because of the uniformity and low profile, the truck owner could still haul building materials and other cargo within the bed 2 without interference.

Figure 5:
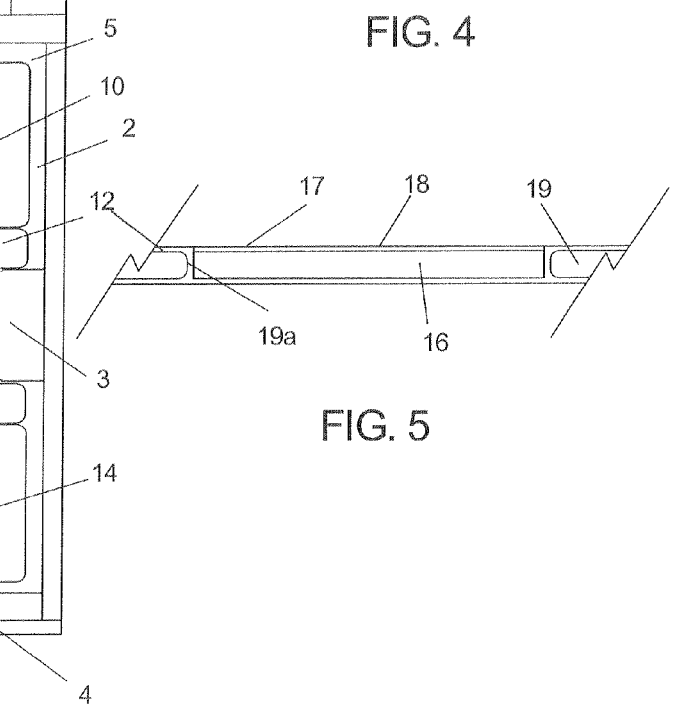
FIG. 5 shows a fragmented cross-sectional view of the main panel having the weight holding and cargo-securing receptacle.

Within the central portion 15 of the main panel 12, a receptacle 16 is defined. With particular reference to FIG. 5, the receptacle 16 is a generally rectangular cavity formed within the interior 19 of the main panel 12 adapted to securely store articles. As shown by cross-sectional view, the interior 19 of the main panel 12 includes one or more longitudinal support members 19a, a pair of which form opposing boundaries of the receptacle 16. Such support members 19a can also be formed within the front panel 10 and rear panel 14 to add to the strength and rigidity of each panel. As a form of cargo holder, articles can be kept dry or conveniently transported and stored within the main panel 12 as the accessory with receptacle 16 acts as a sealed trunk within the pick-up truck bed 2. A lid 18 is formed along the top surface 17 of the main panel 12 to help secure the articles and maintain the flat top surface 17 of the instant accessory. Depending on the dimensions of the main panel 12 or lid 18, the lid 18 can be removable or hingedly attached to the main panel 12 to cover the receptacle 16 at a central portion 15 of the main panel 12, or the lid 18 can actually form the entire top surface 17 of the main panel 12, and as such the entire top surface 17 of the main panel 12 can be lifted up to reveal the interior receptacle 16.

As part of a winter weight package, a weight holder 20 is provided for placement within the receptacle 16. The weight holder 20 is a foam or similar lightweight material container which includes a foldable flap 26. The weight holder comprises a plurality of weight receiver bins 24 or compartments adapted to secure weights 22 therein. Conveniently, each weight receiver bin 24 is open at the top so that the weights 22 are easily insertable and viewable, avoiding the problem of misappropriating the weights or losing the weights underneath inaccessible spaces of integral bed liners. The individual weights secured into the weight holder 20 could be made from galvanized steel or other suitable metal. As such, the weight over the rear axle can be varied depending on the number of weights 22 carried within the weight holder 20. For instance, during periods of inclement weather when all of the weights are placed within the weight holder 20, maximum weight would be applied over the rear axle of the truck 1. During periods of non-use, only the weights 22 or simply the entire weight holder 20 would be removed, if at all, to maintain the utility of the truck bed, rather than require all panels be removed or manipulated. The amount of downward force thus varies with the vehicle owner adding as much weight as desired. To further aid in securing the weights 22 within the weight holder 20, a tack strip 28 is formed at the bottom of each weight receiver bin 24.

I claim:

1. An accessory for a bed of a truck, comprising:
a front panel;
a rear panel;
a main panel having a central portion, a top surface and an interior, said main panel removably connected to said front panel and to said rear panel such that said main panel is disposed between said front panel and said rear panel with said central portion adapted to be situated between wheel wells of said truck and over a rear axle of said truck;
a receptacle defined within said interior of said main panel, said receptacle being defined on two sides by one or more longitudinal support members disposed within said interior of said main panel;
a weight holder for placement within said receptacle, said weight holder comprising a plurality of weight receiver bins adapted to secure weights therein, wherein said weight over said rear axle can be varied; and, a lid attached to said main panel for covering said receptable and said weight holder, said lid being flush with said top surface of said main panel when in a closed position.

2. The truck bed accessory of claim 1, wherein said weight holder further comprises a flap attached thereto for covering said weight receiver bins.

3. The truck bed accessory of claim 1, wherein said weight holder further comprises a tack strip adhered to a bottom of one or more of said weight receiver bins.

4. The truck bed accessory of claim 1, wherein said main panel further comprises a front edge, a rear edge, a left edge, and a right edge, said front edge including a means for interlocking said main panel to said front panel, said rear edge including a means for interlocking said main panel to said rear panel, and each said left edge and said right edge being generally u-shaped to define a well space through which each wheel well of said truck can be situated.

5. The truck bed accessory of claim 1, wherein said receptacle is adapted to contain articles other than said weight holder and function as a sealed trunk when said weight holder is not in use within said main panel.

6. An accessory for a bed of a truck, comprising:
one or more panels including at least one main panel, said main panel having a central portion, a top surface, an interior, a left edge, and a right edge, each said left edge and said right edge being generally u-shaped to define a well space through which each wheel well of said truck can be situated and wherein said wheel wells hold said main panel in place in said bed;
a receptacle defined within said interior of said main panel at said central portion, said receptacle being defined on two sides by one or more longitudinal support members disposed within said interior of said main panel;
a weight holder for placement within said receptacle, said weight holder comprising a plurality of laterally disposed and open-top weight receiver bins adapted to secure weights therein, wherein said weight over said rear axle can be varied; and,
a lid attached to said main panel for covering said receptable and said weight holder, said lid being flush with said top surface of said main panel when in a closed position.

7. The truck bed accessory of claim 1, wherein said weight holder further comprises a flap attached thereto for covering said weight receiver bins.

8. The truck bed accessory of claim 1, wherein said weight holder further comprises a tack strip adhered to a bottom of one or more of said weight receiver bins.

9. The truck bed accessory of claim 1, wherein said receptacle is adapted to contain articles other than said weight holder to function as a sealed trunk when said weight holder is not in use within said main panel.

10. An accessory for a vehicle, comprising:
one or more panels including at least one main panel, said main panel having a central portion, a top surface, an interior, a left edge, and a right edge;
a receptacle defined within said interior of said main panel at said central portion, said receptacle being defined on two sides by one or more longitudinal support members disposed within said interior of said main panel, said receptacle adapted to contain articles and function as a sealed trunk;
a weight holder for placement within said receptacle when said articles are not contained within said receptacle, said weight holder comprising a plurality of laterally disposed and open-top weight receiver bins adapted to secure weights therein, wherein weight over a rear axle of said vehicle can be varied; and,
said top surface being hingedly attached to said main panel for covering said interior and said weight holder.

* * * * *